US007014695B2

(12) United States Patent
Koga et al.

(10) Patent No.: US 7,014,695 B2
(45) Date of Patent: Mar. 21, 2006

(54) WATER BASE INK FOR INK-JET RECORDING

(75) Inventors: Narumi Koga, Nagoya (JP); Masaya Fujioka, Nagoya (JP); Hideo Ohira, Tajimi (JP); Kazuma Goto, Nagoya (JP); Hiromitsu Sago, Tokai (JP); Shunichi Higashiyama, Yotsukaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/387,739

(22) Filed: Mar. 13, 2003

(65) Prior Publication Data

US 2003/0179268 A1 Sep. 25, 2003

(30) Foreign Application Priority Data

Mar. 14, 2002 (JP) ............................ 2002-070822

(51) Int. Cl.
*C09D 11/02* (2006.01)
*G01D 11/00* (2006.01)

(52) U.S. Cl. .............................. 106/31.43; 106/31.58; 106/31.59; 106/31.75; 106/31.86; 106/31.89; 347/100

(58) Field of Classification Search ............. 106/31.43, 106/31.58, 31.59, 31.75, 31.86, 31.89; 347/100
See application file for complete search history.

(56) References Cited

U.S. PATENT DOCUMENTS

| | | | | |
|---|---|---|---|---|
| 4,508,570 | A * | 4/1985 | Fujii et al. | 106/31.43 |
| 4,709,247 | A * | 11/1987 | Piatt et al. | 347/40 |
| 5,067,980 | A * | 11/1991 | Koike et al. | 106/31.46 |
| 5,106,416 | A * | 4/1992 | Moffatt et al. | 106/31.43 |
| 5,124,718 | A * | 6/1992 | Koike et al. | 347/100 |
| 5,256,192 | A * | 10/1993 | Liu et al. | 106/31.15 |
| 5,814,685 | A * | 9/1998 | Satake et al. | 523/201 |
| 5,954,866 | A * | 9/1999 | Ohta et al. | 106/31.89 |
| 6,095,645 | A * | 8/2000 | Owatari et al. | 347/105 |
| 6,153,001 | A * | 11/2000 | Suzuki et al. | 106/31.65 |
| 6,454,846 | B1 * | 9/2002 | Yatake | 106/31.58 |
| 6,500,248 | B1 * | 12/2002 | Hayashi | 106/31.86 |
| 6,637,875 | B1 * | 10/2003 | Kaneko et al. | 347/100 |
| 2003/0032697 | A1 * | 2/2003 | Koga et al. | 523/160 |
| 2003/0089272 | A1 * | 5/2003 | Taniguchi et al. | 106/31.13 |
| 2003/0174193 | A1 * | 9/2003 | Sago et al. | 347/100 |

FOREIGN PATENT DOCUMENTS

| | | |
|---|---|---|
| JP | 8-259864 | 10/1996 |
| JP | 8-283631 | 10/1996 |

* cited by examiner

*Primary Examiner*—Karl Group
*Assistant Examiner*—Veronica F. Faison
(74) *Attorney, Agent, or Firm*—Reed Smith LLP

(57) ABSTRACT

A water base ink for ink-jet recording contains a surfactant represented by the following formula (1) or (2), dipropylene glycol, a coloring agent, and water:

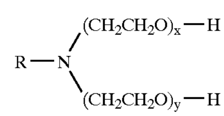

(1)

$$CH_3—(CH_2)_{11}—O—(CH_2CH_2O)_z—H \quad (2)$$

In the formula (1), R represents alkyl group, and x and y represent integers which satisfy x+y=5 to 15. In the formula (2), z represents an integer of not more than 9. The performance of initial introduction into a recording head is satisfactory, and it is possible to simultaneously reduce the feathering and the color bleed even when the recording is performed on regular paper.

12 Claims, 3 Drawing Sheets

WATER BASE INK FOR INK-JET RECORDING

BACKGROUND OF THE INVENTION

1. Field of the Invention

The present invention relates to a water base ink for ink-jet recording to be used for an ink-jet recording apparatus and an ink-jet recording apparatus which accommodates the same.

2. Related Art

In the ink-jet recording system, ink droplets are formed by using an ink discharge method including, for example, the electrostatic attraction method, the method in which mechanical vibration or displacement is applied to the ink by using a piezoelectric element or the like, and the method in which bubbles are generated by heating the ink to utilize the pressure generated thereby, and all or a part of the ink droplets are adhered to an objective recording material such as paper to perform the recording.

Those used as the ink for ink-jet recording to be used for the ink-jet recording system as described above include those obtained by dissolving or dispersing a water-soluble dye or a pigment in water or a liquid medium composed of water and a water-soluble organic solvent. In order to perform the recording in a well-suited manner for a long period of time by effecting the stable discharge without causing any clog-up at the nozzle and the orifice of the ink-jet printer, for example, the water base ink for ink-jet recording is required to have the following features. That is, the physical property values of the viscosity, the surface tension, and the density are appropriate values, neither appearance of any deposit nor change of the physical property value is caused, and the recorded image is excellent in water resistance and light resistance.

However, the conventional water base ink for ink-jet recording involved the following problem. That is, when a new ink cartridge is installed to the ink-jet printer to start the printing, then the ink cannot smoothly enter the narrow ink flow passage of the recording head, and any discharge defect such as discharge failure may be caused in some cases. Therefore, in order to perform the recording in a well-suited manner by avoiding, for example, the discharge failure at the recording head nozzle of the ink-jet printer, it has been necessary that the wettability of the ink in the recording head nozzle is improved to improve the performance of initial introduction into the recording head.

In order to obtain a good printing quality without any ink blur when the recording is performed with the ink-jet printer, the exclusive ink-jet paper is used. However, in recent years, it is more demanded to perform the recording on the regular paper rather than on the exclusive ink-jet paper, in view of the running cost and the consideration of the environment. Further, in the market of the ink-jet printer directed to home use and office use, the color ink-jet printer is overwhelmingly demanded as compared with the monochrome ink-jet printer. Nowadays, the color ink-jet printer is ordinary and normal. In contrast to such a situation, the conventional water base ink for ink-jet recording has involved such a problem that the printing quality is not sufficient when the recording is performed on the regular paper.

The principal factors of the insufficient printing quality on the regular paper may be pointed out as follows. Firstly, there is the feathering in which the ink is spread nonuniformly along the surface of the recording paper when the ink is permeated into the recording paper, and the edge of the image portion is notched, resulting in the failure to obtain any sharp edge of the image portion. Secondly, there is the color bleed in which the inks are mixed with each other at the portion (hereinafter referred to as "boundary" as well) at which the inks of different colors are adjoined, and the both inks are blurred, resulting in the deterioration of the printing quality.

Many techniques have been hitherto used in order to improve the performance of initial introduction into the recording head and avoid the feathering and the color bleed. In order to improve the performance of initial introduction into the recording head, for example, a method has been used generally and widely, in which the surface tension is lowered to an optimum value by adding an appropriate amount of surfactant to improve the wettability in the recording head. However, the ink, which is obtained by this method, has involved the following problems. That is, the surface tension is lowered, the wettability on the recording paper is raised as well, and the feathering is apt to occur.

In order to avoid the feathering, a method has been used generally and widely, in which the surface tension is raised. Specifically, for example, Japanese Patent Application Laid-open No. 8-259864 discloses a technique in which the permeation of the ink along the surface of the recording paper is suppressed to avoid the feathering by allowing the surface tension of the ink to be not less than 40 mN/m. However, the ink, which is obtained by this method, has involved the following problems. That is, the wettability on the recording paper is deteriorated, and the color bleed is caused in some cases. The drying performance of the ink on the recording paper is deteriorated, and the performance of initial introduction into the recording head is deteriorated in other cases.

In order to avoid the color bleed, those which have been used generally and widely include a method in which alkyl ether of polyvalent alcohol such as diethylene glycol monobutyl ether is blended as a permeating agent, and a method in which a surfactant is blended. Specifically, for example, Japanese Patent Application Laid-open No. 8-283631 discloses a technique in which a permeating agent and a surfactant are added into an ink to lower the surface tension so that the permeability into the paper is enhanced to avoid the color bleed. However, the ink, which is obtained by this method, has involved such a problem that it is impossible to suppress the feathering.

As described above, the conventional water base inks for ink-jet recording have involved such problems that it is impossible to realize both of the improvement in performance of initial introduction into the recording head and the improvement in printing quality to be brought about by avoiding the feathering and the color bleed, and it is impossible to obtain any sufficient printing quality.

SUMMARY OF THE INVENTION

The present invention has been made in order to solve the problems involved in the conventional technique as described above, an object of which is to provide a water base ink for ink-jet recording which is satisfactory in performance of initial introduction into a recording head and which makes it possible to simultaneously reduce the feathering and the color bleed even when the recording is performed on the regular paper, and an ink-jet recording apparatus which accommodates the same.

According to a first aspect of the present invention, there is provided a water base ink for ink-jet recording containing a surfactant represented by the following formula (1) or (2), dipropylene glycol, a coloring agent, and water:

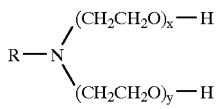

(1)

In the formula (1), R represents alkyl group and x and y represent integers which satisfy x+y=5 to 15.

$$CH_3—(CH_2)_{11}—O—(CH_2CH_2O)_z—H \quad (2)$$

In the formula (2), z represents an integer of not more than 9.

According to a second aspect of the present invention, there is provided an ink-jet recording apparatus comprising:

an ink-jet head which jets an ink; and a replaceable ink cartridge which accommodates the ink, wherein:

the ink includes the ink according to the first aspect of the present invention. The ink-jet recording apparatus of the present invention is provided with the replaceable ink cartridge which is filled with the ink of the present invention. Therefore, the performance of initial introduction of the ink into the recording head is satisfactory when the replaceable ink cartridge is replaced with another replaceable ink cartridge of the same type. It is possible to form a good image in which the feathering and the color bleed are avoided.

BRIEF DESCRIPTION OF THE DRAWINGS

An embodiment of the invention will be described in detail with reference to the following figures wherein.

DESCRIPTION OF THE PREFERRED EMBODIMENTS

Figure 1:
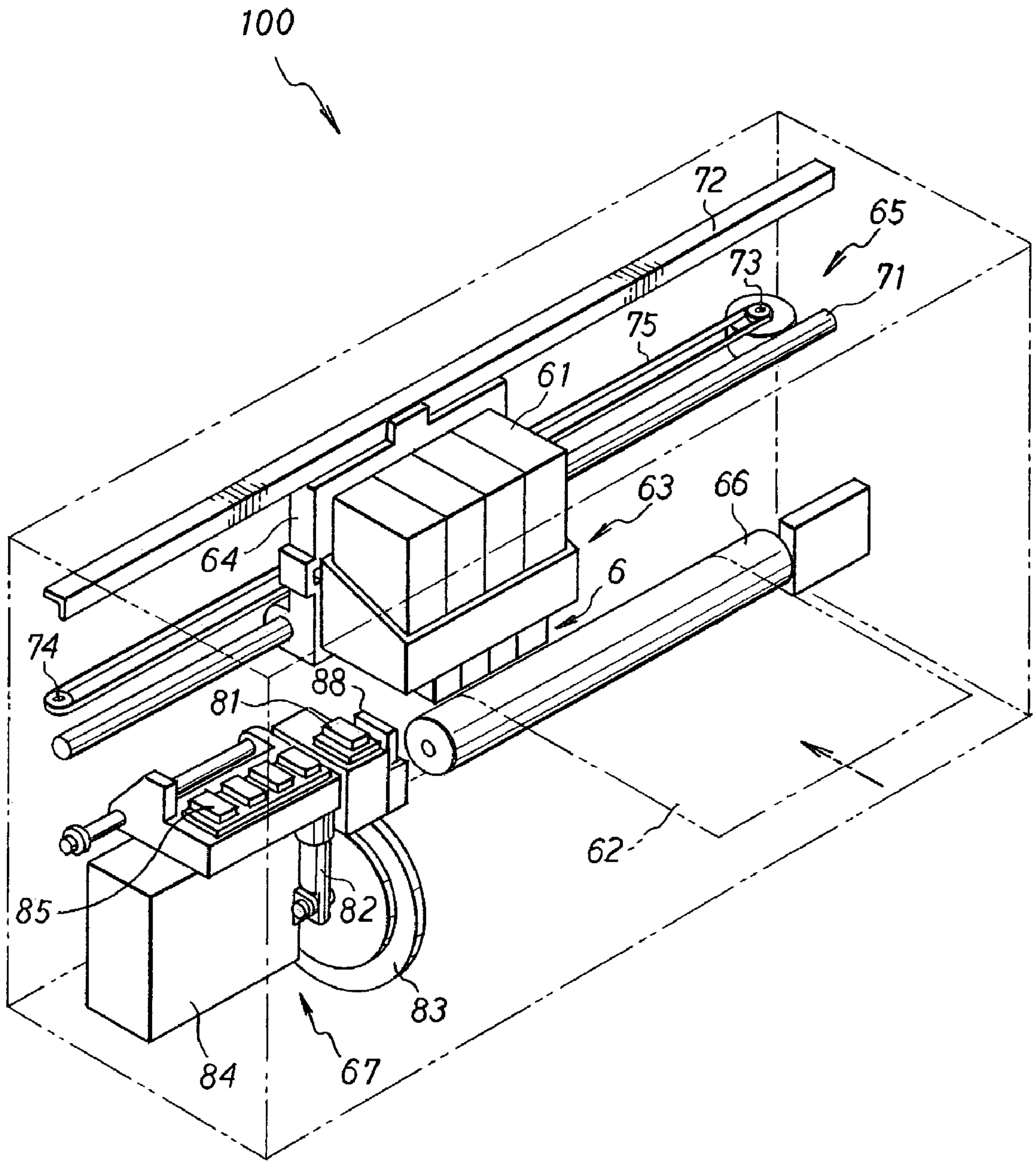
FIG. 1 is a perspective view showing a color ink-jet printer having an ink cartridge which contains ink prepared in examples of the invention.

The water base ink for ink-jet recording of the present invention contains the surfactant represented by the following formula (1) or the surfactant represented by the following formula (2). The surfactant represented by the following formula (1) or the surfactant represented by the following formula (2) lowers the surface tension of the water base ink for ink-jet recording of the present invention to have the optimum value at which the good performance of initial introduction into the recording head is obtained without deteriorating the printing quality which would be otherwise deteriorated by the feathering and the color bleed.

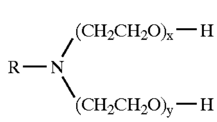

(1)

In the formula (1), R represents alkyl group and x and y represent integers which satisfy x+y=5 to 15. If (x+y) is less than 5, the solubility in water is low. Therefore, the range of use is limited, and the performance of versatility is deficient. If (x+y) exceeds 15, then the force to lower the surface tension is weakened, and the compound is required to be added in a large amount. Therefore, it is difficult to maintain a sharp edge of the image portion.

$$CH_3—(CH_2)_{11}—O—(CH_2CH_2O)_z—H \quad (2)$$

In the formula (2), z represents an integer of not more than 9. If z exceeds 9, then the force to lower the surface tension is weakened, and the compound is required to be added in a large amount. Therefore, it is difficult to maintain a sharp edge of the image portion.

The surfactant represented by the general formula (1) is not specifically limited, including, for example, polyoxyethylene alkylamine such as polyoxyethylene oleylamine and polyoxyethylene laurylamine. In general, the compound represented by the general formula (1) resides in substances contained in natural products such as coconut oil, beef tallow, and soybean oil. The compounds as represented by the general formula (1), which have alkyl groups having different numbers of carbon atoms and which have different values of (x+y), are present and distributed in a variety of ratios in the oils as described above. Therefore, it is convenient to use products derived from the oils and fats as described above. The products as described above include, for example, ETHOMEEN C/15 (x+y=5; numbers of carbon atoms of alkyl group: C8 to C18; main component has a number of carbon atoms of C12), ETHOMEEN C/20 (x+y=10; numbers of carbon atoms of alkyl group: C8 to C18; main component has a number of carbon atoms of C12), ETHOMEEN C/25 (x+y=15; numbers of carbon atoms of alkyl group: C8 to C18; main component has a number of carbon atoms of C12), ETHOMEEN S/15 (x+y=5; numbers of carbon atoms of alkyl group: C16 to C18; main component has a number of carbon atoms of C18), ETHOMEEN S/20 (x+y=10; numbers of carbon atoms of alkyl group: C16 to C18; main component has a number of carbon atoms of C18), ETHOMEEN S/25 (x+y=15; numbers of carbon atoms of alkyl group: C16 to C18; main component has a number of carbon atoms of C18), ETHOMEEN T/15 (x+y=5; numbers of carbon atoms of alkyl group: C12 to C18; main component has a number of carbon atoms of C18), ETHOMEEN T/20 (x+y=10; numbers of carbon atoms of alkyl group: C12 to C18; main component has a number of carbon atoms of C18), and ETHOMEEN T/25 (x+y=15; numbers of carbon atoms of alkyl group: C12 to C18; main component has a number of carbon atoms of C18) (all produced by Lion Akzo Co., Ltd.). ETHOMEEN C/15, C/20, and C/25 are surfactants derived from coconut oil, ETHOMEEN S/15, S/20, and S/25 are surfactants derived from soybean oil, and ETHOMEEN T/15, T/20, and T/25 are surfactants derived from beef tallow.

The surfactant represented by the general formula (2) is not specifically limited, including, for example, polyoxyethylene (3) lauryl ether, polyoxyethylene (4) lauryl ether, polyoxyethylene (4,1) lauryl ether, polyoxyethylene (4,9) lauryl ether, and polyoxyethylene (6,0) lauryl ether. Those commercially available of the surfactant as described above include, for example, EMULGEN 104P (z=4), EMULGEN 105 (z=5), EMULGEN 106 (z=5), and EMULGEN 108 (z=6) (all produced by Kao Corporation).

The blending amount of the surfactant represented by the formula (1) or the surfactant represented by the formula (2)

in the water base ink for ink-jet recording of the present invention is preferably 0.01 to 10% by weight with respect to the total amount of the water base ink for ink-jet recording of the present invention. If the blending amount is less than 0.01% by weight, then the wettability of the ink with respect to the recording head is deteriorated, and the performance of initial introduction into the recording head is deteriorated. If the blending amount exceeds 10% by weight, then the ink nonuniformly moistens those disposed around the nozzle of the recording head, and the discharge stability of the ink is deteriorated. More preferably, the blending amount is 0.1 to 3% by weight.

The water base ink for ink-jet recording of the present invention contains dipropylene glycol. The dipropylene glycol greatly participates in the permeability of the water base ink for ink-jet recording of the present invention into the recording paper. The permeation velocity into the recording paper is slow as compared with general permeating agents such as glycol ether. The dipropylene glycol is the most appropriate solvent to retain the sharpness of the edge of the image portion.

The blending amount of the dipropylene glycol in the water base ink for ink-jet recording of the present invention is preferably 1 to 20% by weight with respect to the water base ink for ink-jet recording of the present invention. If the blending amount is less than 1% by weight, then the permeation velocity of the water base ink for ink-jet recording of the present invention into the recording paper is slow, the drying time is prolonged, and the color bleed may be caused in some cases. If the blending amount exceeds 20% by weight, then the water base ink for ink-jet recording of the present invention is extremely permeated into the recording paper, the ink arrives at the back of the recording paper in some cases, and the feathering may be caused in other cases. More preferably, the blending amount is 3 to 15% by weight.

The water base ink for ink-jet recording of the present invention contains the coloring agent. The coloring agent is not specifically limited, including, for example, water-soluble dyes and pigments. The water-soluble dye is not specifically limited, including, for example, direct dyes, acid dyes, basic dyes, and reactive dyes. In particular, those, which are preferred and which satisfy the performance such as the vividness, the water-solubility, the stability, and the light resistance, include, for example, C. I. Direct Black 17, 19, 32, 51, 71, 108, 146, 154, 168; C. I. Direct Blue 6, 22, 25, 71, 86, 90, 106, 199; C. I. Direct Red 1, 4, 17, 28, 80, 83, 227; C. I. Direct Yellow 12, 24, 26, 86, 98, 132, 142; C. I. Direct Orange 34, 39, 44, 46, 60; C. I. Direct Violet 47, 48; C. I. Direct Brown 109; C. I. Direct Green 59; C. I. Acid Black 2, 7, 24, 26, 31, 52, 63, 112, 118; C. I. Acid Blue 9, 22, 40, 59, 93, 102, 104, 113, 117, 120, 167, 229, 234; C. I. Acid Red 1, 6, 32, 37, 51, 52, 80, 85, 87, 92, 94, 115, 181, 256, 289, 315, 317; C. I. Acid Yellow 11, 17, 23, 25, 29, 42, 61, 71; C. I. Acid Orange 7, 19; C. I. Acid Violet 49; C. I. Basic Black 2; C. I. Basic Blue 1, 3, 5, 7, 9, 24, 25, 26, 28, 29; C. I. Basic Red 1, 2, 9, 12, 13, 14, 37; C. I. Basic Violet 7, 14, 27; and C. I. Food Black 1, 2; C. I. Reactive Black 1, 3, 5, 6, 8, 12, 14; C. I. Reactive Yellow 1, 2, 3, 13, 14, 15, 17; C. I. Reactive Orange 2, 5, 7, 16, 20, 24; C. I. Reactive Red 6, 7, 11, 12, 15, 17, 21, 23, 24, 35, 36, 42, 63, 66, 180; C. I. Reactive Violet 2, 4, 5, 8, 9; C. I. Reactive Blue 2, 5, 7, 12, 13, 14, 15, 17, 18, 19, 20, 21, 25, 27, 28, 37, 38, 40, 41, 71, C. I. Reactive Green 5, 7; C. I. Reactive Brown 1, 7, 16.

The pigment is not specifically limited provided that the pigment is dispersible in the water phase. It is possible to use both of organic pigments and inorganic pigments. The organic pigment is not specifically limited. Those preferably usable include, for example, azo pigment such as azo lake, insoluble azo pigment, condensed azo pigment, and chelate azo pigment; polycyclic pigment such as phthalocyanine pigment, perylene pigment, perynone pigment, anthraquinone pigment, quinacridone pigment, dioxazine pigment, thioindigo pigment, isoindolinone pigment, and quinophthalone pigment; dye lake such as basic dye type lake and acid dye type lake; nitro pigment, nitroso pigment, and aniline black daylight fluorescent pigment. The inorganic pigment is not specifically limited. Those preferably usable include, for example, carbon black, titanium oxide, and iron oxide. The water-soluble dye and the pigment as described above may be used singly respectively. Alternatively, two or more of the water-soluble dyes and/or the pigments as described above may be used in combination by combining the water-soluble dyes, the pigments, or the water-soluble dyes and the pigments.

The blending amount of the coloring agent in the water base ink for ink-jet recording of the present invention is generally 0.1 to 20% by weight with respect to the total amount of the water base ink for ink-jet recording of the present invention. The blending amount is preferably 0.3 to 15% by weight and more preferably 0.5 to 10% by weight.

As for the water, it is preferable to use those having high purity such as ion exchange water and distilled water rather than ordinary water. The blending amount of the water in the water base ink for ink-jet recording of the present invention is generally 10 to 98% by weight with respect to the total amount of the water base ink for ink-jet recording of the present invention. The blending amount is preferably 30 to 97% by weight and more preferably 40 to 95% by weight.

Further, if necessary, conventionally known various types of dispersing agents, viscosity-adjusting agents, surface tension-adjusting agents, pH-adjusting agents, antiseptic/fungicidal agents, and other similar compounds may be added to the water base ink for ink-jet recording of the present invention.

In order to prevent the ink from drying at the nozzle of the recording head of the ink-jet printer, the water base ink for ink-jet recording of the present invention may contain a substance which improves the stability of liquid. The substance, which improves the stability of liquid, is not specifically limited, including, for example, polyvalent alcohols such as ethylene glycol, diethylene glycol, triethylene glycol, polyethylene glycol, 1,3-butanediol, 1,5-pentanediol, 1,6-hexanediol, glycerol, 1,2,6-hexanetriol, 1,2,4-butanetriol, 1,2,3-butanetriol, and petriol; nitrogen-containing heterocyclic compounds such as N-methyl-2-pyrrolidone, N-hydroxyethyl-2-pyrrolidone, 2-pyrrolidone, 1,3-dimethylimidazolidinone, and ε-caprolactam; amides such as formamide, N-methylformamide, and N,N-dimethylformamide; amines such as monoethanolamine, diethanolamine, triethanolamine, monoethylamine, diethylamine, and triethylamine; and sulfur-containing compounds such as dimethylsulfoxide, sulfolane, and thiodiethanol. The substance to improve the stability of liquid as described above may be used singly. Alternatively, two or more of the substances to improve the stability of liquid as described above may be used in combination. The blending amount of the substance to improve the stability of liquid in the water base ink for ink-jet recording of the present invention is determined within a wide range depending on the composition or the desired characteristics of the water base ink for ink-jet recording of the present invention. However, the blending amount is generally 0 to 40% by weight and preferably 5 to 30% by weight.

When the water base ink for ink-jet recording of the present invention is used for the ink-jet recording system of the type in which the recording liquid is electrically charged, a specific resistance-adjusting agent including, for example, inorganic salts such as lithium chloride, ammonium chloride, and sodium chloride may be added. When the water base ink for ink-jet recording of the present invention is applied to the ink-jet recording system of the type in which the ink is discharged in accordance with the action of the thermal energy, values of thermal physical properties including, for example, those of the specific heat, the coefficient of thermal expansion, and the coefficient of thermal conductivity may be adjusted.

The water base ink for ink-jet recording of the present invention contains the surfactant represented by the formula (1) or the surfactant represented by the formula (2) and the dipropylene glycol as described above. Accordingly, it is possible to obtain the satisfactory performance of initial introduction into the recording head by decreasing the surface tension down to the optimum value, and it is possible to avoid the feathering and the color bleed.

EXAMPLES

The present invention will be explained in further detail below as exemplified by Examples. However, the present invention is not limited to only Examples.

Example 1

An ink set was prepared by using ETHOMEEN C/15 (produced by Lion Akzo Co., Ltd., x+y=5) as the surfactant represented by the formula (1). The compositions of the respective inks are shown in Table 1. CAB-O-JET 300 Black (produced by Cabot) as a pigment was used as the coloring agent of the black ink.

TABLE 1

| | Composition (% by weight) | | | |
|---|---|---|---|---|
| Ink set of Example 1 | Black | Yellow | Magenta | Cyan |
| Pure water | 41.45 | 68.75 | 65.75 | 68.75 |
| CAB-O-JET 300 Black | 33.3 | — | — | — |
| C.I. Direct Yellow 132 | — | 3 | — | — |
| C.I. Direct Red 80 | — | — | 3 | — |
| C.I. Direct Blue 199 | — | — | — | 3 |
| Dipropylene glycol | 5 | 5 | 5 | 5 |
| ETHOMEEN C/15 | 0.25 | 0.25 | 0.25 | 0.25 |
| Glycerol | 20 | 23 | 26 | 23 |

Example 2

An ink set was prepared by using ETHOMEEN S/15 (produced by Lion Akzo Co., Ltd., x+y=5) as the surfactant represented by the formula (1). The compositions of the respective inks are shown in Table 2.

TABLE 2

| | Composition (% by weight) | | | |
|---|---|---|---|---|
| Ink set of Example 2 | Black | Yellow | Magenta | Cyan |
| Pure water | 43.6 | 71.9 | 69.9 | 71.9 |
| CAB-O-JET 300 Black | 33.3 | — | — | — |
| C.I. Direct Yellow 132 | — | 3 | — | — |
| C.I. Direct Red 80 | — | — | 3 | — |
| C.I. Acid Blue 9 | — | — | — | 3 |
| Dipropylene glycol | 10 | 10 | 10 | 10 |
| ETHOMEEN S/15 | 0.1 | 0.1 | 0.1 | 0.1 |
| Glycerol | 13 | 15 | 17 | 15 |

Example 3

An ink set was prepared by using ETHOMEEN T/25 (produced by Lion Akzo Co., Ltd., x+y=15) as the surfactant represented by the formula (1). The compositions of the respective inks are shown in Table 3.

TABLE 3

| | Composition (% by weight) | | | |
|---|---|---|---|---|
| Ink set of Example 3 | Black | Yellow | Magenta | Cyan |
| Pure water | 71.75 | 68.75 | 65.75 | 68.75 |
| C.I. Direct Black 17 | 3 | — | — | — |
| C.I. Direct Yellow 86 | — | 3 | — | — |
| C.I. Direct Red 80 | — | — | 3 | — |
| C.I. Direct Blue 199 | — | — | — | 3 |
| Dipropylene glycol | 15 | 15 | 15 | 15 |
| ETHOMEEN T/25 | 0.25 | 0.25 | 0.25 | 0.25 |
| Glycerol | 10 | 13 | 16 | 13 |

Example 4

An ink set was prepared by using EMULGEN 106 (produced by Kao Corporation) as the surfactant represented by the formula (2). The compositions of the respective inks are shown in Table 4.

TABLE 4

| | Composition (% by weight) | | | |
|---|---|---|---|---|
| Ink set of Example 4 | Black | Yellow | Magenta | Cyan |
| Pure water | 41.45 | 68.75 | 65.75 | 68.75 |
| CAB-O-JET 300 Black | 33.3 | — | — | — |
| C.I. Direct Yellow 132 | — | 3 | — | — |
| C.I. Direct Red 80 | — | — | 3 | — |
| C.I. Direct Blue 199 | — | — | — | 3 |
| Dipropylene glycol | 5 | 5 | 5 | 5 |
| EMULGEN 106 | 0.25 | 0.25 | 0.25 | 0.25 |
| Glycerol | 20 | 23 | 26 | 23 |

Example 5

An ink set was prepared by using EMULGEN 106 (produced by Kao Corporation) as the surfactant represented by the formula (2). The compositions of the respective inks are shown in Table 5.

TABLE 5

| | Composition (% by weight) | | | |
|---|---|---|---|---|
| Ink set of Example 5 | Black | Yellow | Magenta | Cyan |
| Pure water | 73.9 | 71.9 | 69.9 | 71.9 |
| C.I. Direct Black 17 | 3 | — | — | — |
| C.I. Direct Yellow 132 | — | 3 | — | — |
| C.I. Direct Red 80 | — | — | 3 | — |
| C.I. Direct Blue 199 | — | — | — | 3 |
| Dipropylene glycol | 10 | 10 | 10 | 10 |
| EMULGEN 106 | 0.1 | 0.1 | 0.1 | 0.1 |
| Glycerol | 13 | 15 | 17 | 15 |

Comparative Example 1

An ink set was prepared by using dipropylene glycol without using the surfactant represented by the formula (1) and the surfactant represented by the formula (2). The compositions of the respective inks are shown in Table 6.

TABLE 6

| | Composition (% by weight) | | | |
|---|---|---|---|---|
| Ink set of Comp. Ex. 1 | Black | Yellow | Magenta | Cyan |
| Pure water | 41.7 | 69 | 66 | 69 |
| CAB-O-JET 300 Black | 33.3 | — | — | — |
| C.I. Direct Yellow 132 | — | 3 | — | — |
| C.I. Direct Red 80 | — | — | 3 | — |
| C.I. Direct Blue 199 | — | — | — | 3 |
| Dipropylene glycol | 5 | 5 | 5 | 5 |
| Glycerol | 20 | 23 | 26 | 23 |

Comparative Example 2

An ink set was prepared by using ETHOMEEN C/15 (produced by Lion Akzo Co., Ltd., x+y=5) as the surfactant represented by the formula (1) without using dipropylene glycol. The compositions of the respective inks are shown in Table 7.

TABLE 7

| | Composition (% by weight) | | | |
|---|---|---|---|---|
| Ink set of Comp. Ex. 2 | Black | Yellow | Magenta | Cyan |
| Pure water | 46.4 | 73.7 | 70.7 | 73.7 |
| CAB-O-JET 300 Black | 33.3 | — | — | — |
| C.I. Direct Yellow 132 | — | 3 | — | — |
| C.I. Direct Red 80 | — | — | 3 | — |
| C.I. Direct Blue 199 | — | — | — | 3 |
| ETHOMEEN C/15 | 0.3 | 0.3 | 0.3 | 0.3 |
| Glycerol | 20 | 23 | 26 | 23 |

Comparative Example 3

An ink set was prepared by using EMULGEN 106 (produced by Kao Corporation) as the surfactant represented by the formula (2) without using dipropylene glycol. The compositions of the respective inks are shown in Table 8.

TABLE 8

| | Composition (% by weight) | | | |
|---|---|---|---|---|
| Ink set of Comp. Ex. 3 | Black | Yellow | Magenta | Cyan |
| Pure water | 46.45 | 73.75 | 70.75 | 73.75 |
| CAB-O-JET 300 Black | 33.3 | — | — | — |
| C.I. Direct Yellow 132 | — | 3 | — | — |
| C.I. Direct Red 80 | — | — | 3 | — |
| C.I. Direct Blue 199 | — | — | — | 3 |
| EMULGEN 106 | 0.25 | 0.25 | 0.25 | 0.25 |
| Glycerol | 20 | 23 | 26 | 23 |

Comparative Example 4

An ink set was prepared by using ETHOMEEN C/25 (produced by Lion Akzo Co., Ltd., x+y=15) as the surfactant represented by the formula (1) and using diethylene glycol diethyl ether based on glycol ether as the permeating agent. The compositions of the respective inks are shown in Table 9.

TABLE 9

| | Composition (% by weight) | | | |
|---|---|---|---|---|
| Ink set of Comp. Ex. 4 | Black | Yellow | Magenta | Cyan |
| Pure water | 41.45 | 68.75 | 65.75 | 68.75 |
| CAB-O-JET 300 Black | 33.3 | — | — | — |
| C.I. Direct Yellow 132 | — | 3 | — | — |
| C.I. Direct Red 80 | — | — | 3 | — |
| C.I. Direct Blue 199 | — | — | — | 3 |
| Dipropylene glycol diethyl ether | 5 | 5 | 5 | 5 |
| ETHOMEEN C/25 | 0.25 | 0.25 | 0.25 | 0.25 |
| Glycerol | 20 | 23 | 26 | 23 |

Comparative Example 5

An ink set was prepared by using EMULGEN 106 (produced by Kao Corporation) as the surfactant represented by the formula (2) and using tripropylene glycol methyl ether based on glycol ether as the permeating agent. The compositions of the respective inks are shown in Table 10.

TABLE 10

| | Composition (% by weight) | | | |
|---|---|---|---|---|
| Ink set of Comp. Ex. 5 | Black | Yellow | Magenta | Cyan |
| Pure water | 41.2 | 93.5 | 93.5 | 93.5 |
| CAB-O-JET 300 Black | 33.3 | — | — | — |
| C.I. Direct Yellow 86 | — | 3 | — | — |
| C.I. Direct Red 80 | — | — | 3 | — |
| C.I. Direct Blue 199 | — | — | — | 3 |
| Tripropylene glycol methyl ether | 3 | 3 | 3 | 3 |
| EMULGEN 106 | 0.5 | 0.5 | 0.5 | 0.5 |
| Glycerol | 22 | 25 | 28 | 25 |

Comparative Example 6

An ink set was prepared by using dipropylene glycol and OLFINE E1010 (produced by Nissin Chemical Industry Co., Ltd.) as a surfactant other than the surfactant represented by the formula (1) and the surfactant represented by the formula (2). The compositions of the respective inks are shown in Table 11.

TABLE 11

| | Composition (% by weight) | | | |
|---|---|---|---|---|
| Ink set of Comp. Ex. 6 | Black | Yellow | Magenta | Cyan |
| Pure water | 41.45 | 68.75 | 65.75 | 68.75 |
| CAB-O-JET 300 Black | 33.3 | — | — | — |
| C.I. Direct Yellow 132 | — | 3 | — | — |
| C.I. Direct Red 80 | — | — | 3 | — |
| C.I. Acid Blue 9 | — | — | — | 3 |
| Dipropylene glycol | 5 | 5 | 5 | 5 |
| OLFINE E1010 | 0.25 | 0.25 | 0.25 | 0.25 |
| Glycerol | 20 | 23 | 26 | 23 |

Evaluation

The respective materials were sufficiently mixed and agitated for each of the ink compositions prepared in Examples 1, 2, 3, 4, and 5 and Comparative Examples 1, 2, 3, 4, 5, and 6. After that, the interior of the ink vessel was allowed to be in a vacuum state by using a vacuum pump while applying the ultrasonic wave so that the ink was degassed. The degassed black inks, yellow inks, magenta inks, and cyan inks were used to evaluate the recording respectively.

The recording was performed by using (A) an ink-jet printer having a multi-head of the on-demand type (discharge orifice diameter: 35 $\mu$m, resistance value of heating resistor: 150 $\Omega$, driving voltage: 30 V, frequency: 2 KHz) for performing the recording by discharging droplets by applying the thermal energy to the ink in the recording head, and (B) an ink-jet printer having a multi-head of the on-demand type (discharge orifice diameter: 40 $\mu$m, driving voltage: 30 V, frequency: 10 KHz) for performing the recording by generating droplets by applying the pressure to the ink in the recording head by means of the vibration of a piezoelectric element.

(1) Evaluation of Performance of Initial Introduction into Recording Head

The recording was performed after performing the purge (suction of the ink with a pump provided in a printer body) three times after the exchange of the ink cartridge to make the evaluation in accordance with the following evaluation criteria on the basis of the ratio of discharge-successful nozzles with respect to the total nozzles. ++: discharge-successful nozzles were 100% for all of the four colors after performing the purge three times. +: discharge-successful nozzles were not less than 95% for all of the four colors after performing the purge three times. ±: discharge-successful nozzles were not less than 90% for all of the four colors after performing the purge three times. –: discharge-successful nozzles were less than 90% for all of the four colors after performing the purge three times.

(2) Evaluation of Feathering and Color Bleed

The recording was performed on regular paper (Xerox 4200) for an image sample composed of single-color portions which included only single color letters without any background and two-color portions in which inks of two colors were alternately combined as the letter color and the background color. As for the size of the letters of the image sample, the letter size was set to 11 point with Microsoft Word 97. The feathering of the image sample was evaluated on the basis of the following criteria in accordance with the degree of disorder of the line caused by the blur of the ink and the vividness of the letters for each of the single-color portions recorded with the black ink, the yellow ink, the magenta ink, and the cyan ink. ++: the feathering was scarcely caused on the single-color portions of the black, yellow, magenta, and cyan, and the letters were vivid. +: the feathering was slightly caused on some of the single-color portions of the black, yellow, magenta, and cyan, but the letters were sufficiently readable. ±: the feathering was clearly caused on some of the single-color portions of the black, yellow, magenta, and cyan, but the letters were readable. –: the feathering was clearly caused on some of the single-color portions of the black, yellow, magenta, and cyan, and the letters were hardly readable as well.

The color bleed of the image sample was evaluated on the basis of the following criteria by comparing the degree of the blur at the boundary and the vividness of the letters in each of the two-color portions with those of the letters without having any background. ++: the color bleed was scarcely caused in the combinations of the black and the color and the color and the color, and the letters had the vividness of equivalent degree. +: the color bleed was slightly caused in the combinations of the black and the color and the color and the color, but the letters were sufficiently readable. ±: the color bleed was clearly caused in the combinations of the black and the color and the color and the color, but the letters were readable. –: the color bleed was clearly caused in the combinations of the black and the color and the color and the color, and the letters were hardly readable as well.

(3) Overall Evaluation

In the overall evaluation of the image sample, the worst evaluation result of those of the evaluation of the performance of initial introduction into the recording head, the evaluation of the feathering, and the evaluation of the color bleed was regarded as the result of overall evaluation of the ink. Specifically, for example, when the evaluation of the performance of initial introduction into the recording head was "–", the evaluation of the feathering was "++", and the evaluation of the color bleed was "+", then the overall evaluation was "–", because the discharge is extremely unsatisfactory even when the printing quality was excellent so much. Results of the respective evaluations are summarized in Table 12.

TABLE 12

| | Performance of introduction of ink | Feathering | Color bleed | Overall evaluation |
|---|---|---|---|---|
| Example 1 | ++ | ++ | ++ | ++ |
| Example 2 | + | ++ | ++ | + |
| Example 3 | ++ | + | ++ | + |
| Example 4 | ++ | ++ | ++ | ++ |
| Example 5 | + | ++ | ++ | + |
| Comp. Ex. 1 | – | ++ | + | – |
| Comp. Ex. 2 | ± | ++ | – | – |
| Comp. Ex. 3 | ± | ++ | – | – |
| Comp. Ex. 4 | + | – | ± | – |
| Comp. Ex. 5 | + | – | + | – |
| Comp. Ex. 6 | ++ | – | ± | – |

According to Table 12, the water base inks for ink-jet recording prepared in Examples 1 to 5 had the good performance of initial introduction into the recording head. Further, when the water base inks for ink-jet recording prepared in Examples 1 to 5 were used, the sharp line edge and the excellent effect to reduce the color bleed were successfully obtained. On the other hand, in the case of the water base inks for ink-jet recording prepared in Comparative Examples 1 to 6, the performance of initial introduction into the recording head was unsatisfactory in some cases, and the feathering and/or the color bleed was caused when the inks were used in other cases. Accordingly, the following fact has been successfully confirmed. That is, even if the surfactant represented by the formula (1) or the surfactant represented by the formula (2) and the dipropylene glycol are used singly respectively, the effect is obtained to a small extent. When they are used in combination, it is possible to obtain the ink in which the performance of initial introduction into the recording head is satisfactory and it is possible to sufficiently reduce the feathering and the color bleed.

The water base ink for ink-jet recording of the present invention provides the good performance of initial introduction into the recording head. Further, it is possible to simultaneously reduce the feathering and the color bleed, and it is possible to perform the vivid color recording even when the recording is performed on the regular paper. The ink-jet recording apparatus of the present invention provides the good performance of initial introduction into the recording head when the ink cartridge is exchanged. Further, it is possible to simultaneously reduce the feathering and the color bleed, and it is possible to perform the vivid color recording even when the recording is performed on the regular paper.

An embodiment of an ink jet printer as an ink-jet recording apparatus in accordance with the invention will be described as below with reference to the accompanying drawings.

As shown in FIG. 1, a color ink jet printer 100 includes four ink cartridges 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 1.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 2) in the head 6 mounted on the carriage 64 when it returns to the reset position after printing. The ink jet printer 100 is further provided with a wiper 88 adjacent to the purge cap 81. The wiper 88 wipes the nozzle surface to remove the ink on the surface.

Figure 2:
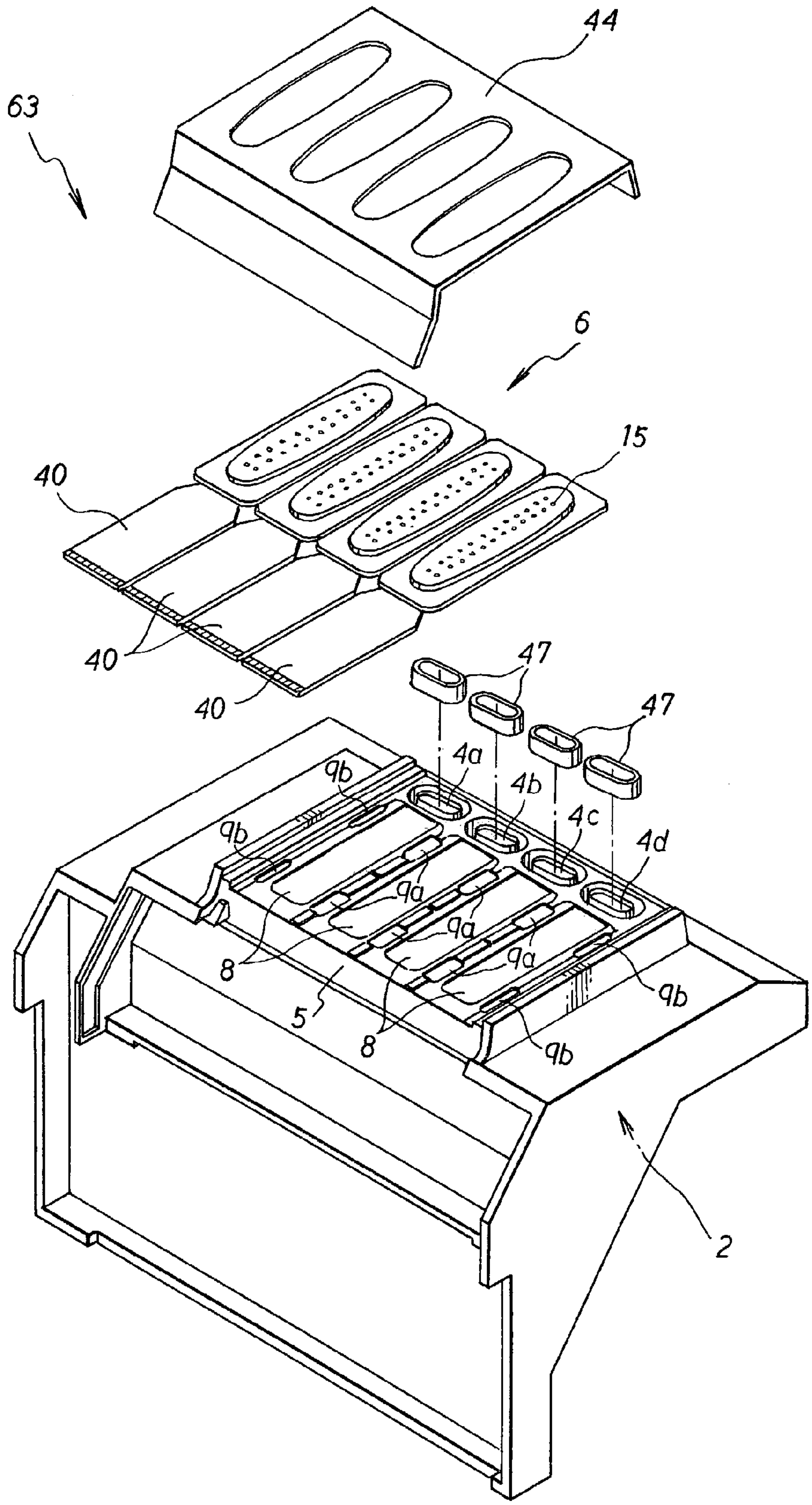
FIG. 2 is a perspective view of a head unit, with its nozzles facing upward.

As shown in FIG. 2, the head unit 63 is mounted on the carriage 64 that moves along the sheet 62 and has a substantially box shape with upper open structure. The head unit 63 has a cover plate 44 made of an elastic thin metallic plate. The cover plate 44 is fixed at the front surface of the head unit 63 and covers the head unit 63 when the head 6 is removed. The head unit 63 also has a mounting portion 2 on which the four ink cartridges 61 are detachably attached from above. Ink supply paths 4*a*, 4*b*, 4*c*, 4*d*, each of which connects respective ink discharge portions of each ink cartridge 61, communicate with a bottom of a bottom plate 5 of the head unit 63. Each of the ink supply paths 4*a*, 4*b*, 4*c*, 4*d* is provided with a rubber packing 47 to intimately contact an ink supply hole 19*a*.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9*a*, 9*b*, which are filled with an UV adhesive to bond the respective blocks of the head 6, are formed to penetrate the bottom plate 5.

Figure 3:
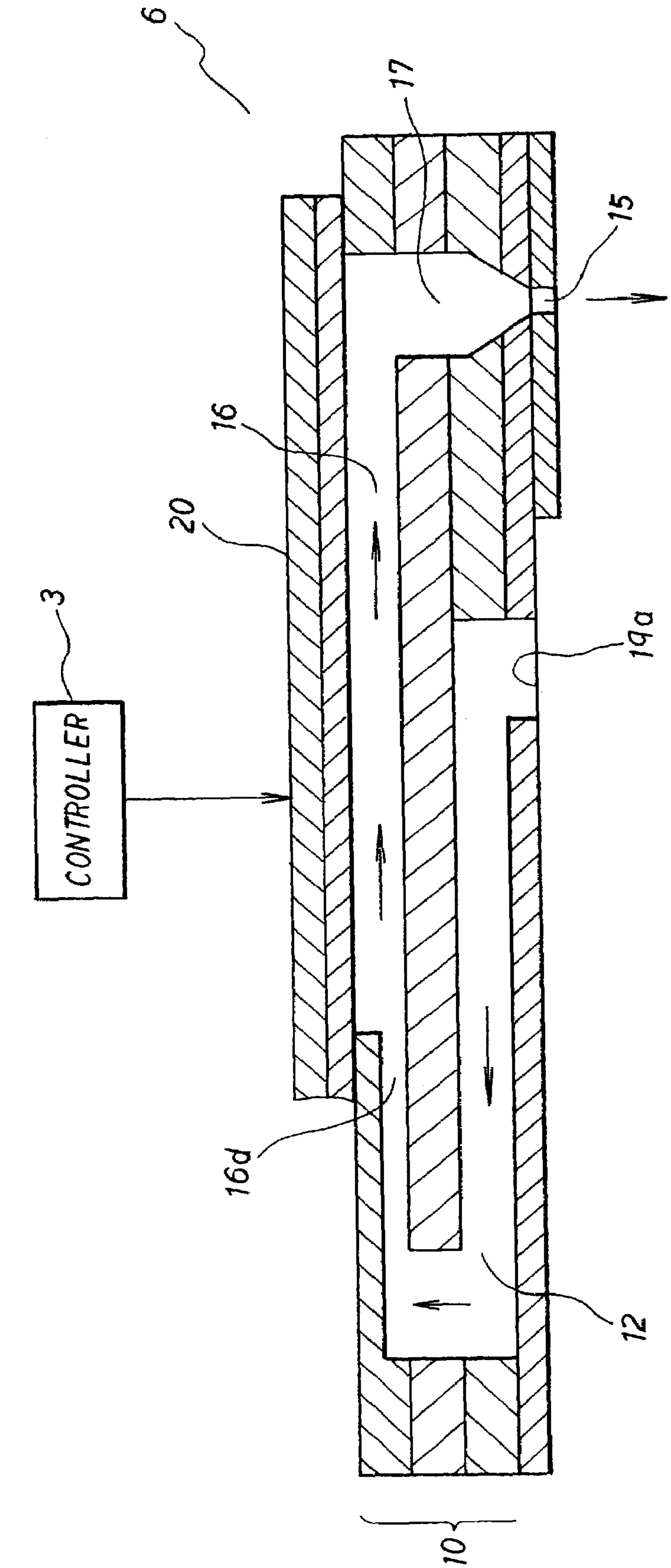
FIG. 3 is a schematic diagram showing the ink jet print head and a controller.

FIG. 3 is a sectional view showing one of the pressure chambers in the head 6. A plurality of pressure chambers 16 are provided in the head 6. The nozzles 15 communicating the respective pressure chambers 16 are provided substantially in line in one surface of the head 6.

As shown in FIG. 3, the head 6 is constructed by the cavity plate 10 comprised of a plurality of thin metal plates which are formed of nickel or nickel alloy and the piezoelectric actuator 20. The cavity plate 10 has the ink supply holes 19*a* connected with the ink cartridge 61, the manifolds 12, the narrowed portions 16*d*, the pressure chambers 16, the through holes 17 and the nozzles 15, which communicate with each other. While the ink supply hole 19*a* opens toward the ejecting direction of the nozzle 15 in FIG. 3 for convenience, the ink supply hole 19*a* actually opens toward the piezoelectric actuator 20.

A controller 3 provides a prestored driving pulse to the piezoelectric actuator 20 by superimposing the driving pulse on a clock signal. The driving pulse can be controlled with a technique disclosed in, for example, U.S. Pat. Nos. 6,312,089, 6,412,923 B1 and 6,760,959. Further, the detailed structure of the printer and controlling method of the head unit are also disclosed in these U.S. patents, a content of which has been incorporated herein by reference.

What is claimed is:

1. A water base ink for ink-jet recording containing a surfactant represented by the following formula (1), dipropylene glycol, a coloring agent, and water:

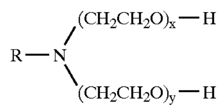

(1)

wherein R represents alkyl group and x and y represent integers which satisfy x+y=5 to 15 in the formula (1);

wherein the surfactant is a mixture of polyoxyethylene alkylamines.

2. The water base ink for ink-jet recording according to claim 1, wherein x+y=5 is satisfied in the formula (1).

3. The water base ink for ink-jet recording according to claim 1, wherein a compound represented by the formula (1) is contained by 0.1 to 3% by weight with respect to a total amount of the water base ink.

4. An ink-jet recording apparatus comprising:

an ink-jet head which jets an ink; and a replaceable ink cartridge which accommodates the ink, wherein:

the ink includes the ink as defined in claim 1.

5. The ink-jet recording apparatus according to claim 4, wherein x+y=5 is satisfied in the formula (1).

6. The ink-jet recording apparatus according to claim 4, wherein a compound represented by the formula (1) is contained by 0.1 to 3% by weight with respect to a total amount of the water base ink.

7. A water base ink for ink-jet recording containing a surfactant represented by the following formula (2), dipropylene glycol, a coloring agent, and water:

$$CH_3—(CH_2)_{11}—O—(CH_2CH_2O)_z—H \quad (2)$$

wherein z represents an integer of not more than 9 in the formula (2), wherein a compound represented by the formula (2) is polyoxyethylene lauryl ether which is contained in an amount of 0.01 to 10% by weight with respect to a total amount of the water base ink, wherein the dipropylene glycol is contained in an amount of 1 to 20% by weight with respect to a total amount of the water base ink.

8. The water base ink for ink-jet recording according to claim 7, wherein z=5 is satisfied in the formula (2).

9. The water base ink for ink-jet recording according to claim 7, wherein the polyoxyethylene lauryl ether is contained by 0.1 to 3% by weight with respect to a total amount of the water base ink.

10. An ink-jet recording apparatus comprising:

an ink-jet head which jets an ink; and a replaceable ink cartridge which accommodates the ink, wherein:

the ink includes the ink as defined in claim 7.

11. The ink-jet recording apparatus according to claim 10, wherein z=5 is satisfied in the formula (2).

12. The ink-jet recording apparatus according to claim 10, wherein the polyoxyethylene lauryl ether is contained by 0.1 to 3% by weight with respect to a total amount of the water base ink.

* * * * *